US007489098B2

(12) United States Patent
Harris et al.

(10) Patent No.: US 7,489,098 B2
(45) Date of Patent: Feb. 10, 2009

(54) SYSTEM FOR MONITORING LOAD AND ANGLE FOR MOBILE LIFT DEVICE

(75) Inventors: Steven C. Harris, Martinsburg, WV (US); Stanley R. Spain, Waynesboro, PA (US); Jeffrey L. Addleman, Chambersburg, PA (US)

(73) Assignee: Oshkosh Corporation, Oshkosh, WI (US)

(*) Notice: Subject to any disclaimer, the term of this patent is extended or adjusted under 35 U.S.C. 154(b) by 495 days.

(21) Appl. No.: 11/263,067

(22) Filed: Oct. 31, 2005

(65) Prior Publication Data

US 2008/0019815 A1 Jan. 24, 2008

Related U.S. Application Data

(63) Continuation-in-part of application No. 11/244,414, filed on Oct. 5, 2005.

(51) Int. Cl.
*B60P 3/12* (2006.01)

(52) U.S. Cl. ....................... 318/565; 318/623; 414/563; 212/277

(58) Field of Classification Search ................. 318/565, 318/566, 623; 388/909; 414/560–563, 539–542; 212/276–281

See application file for complete search history.

(56) References Cited

U.S. PATENT DOCUMENTS

| | | | |
|---|---|---|---|
| 1,614,575 | A | 1/1927 | Siebs |
| 2,477,854 | A | 8/1949 | Baker |
| 3,072,264 | A | 1/1963 | Sennebogen |
| 3,073,458 | A | 1/1963 | Wieschel |
| 3,265,220 | A | 8/1966 | Knight |
| 3,269,560 | A | 8/1966 | Knight |
| 3,279,622 | A | 10/1966 | Person |
| 3,489,294 | A | 1/1970 | Greb et al. |
| 3,680,714 | A | 8/1972 | Holmes |

(Continued)

FOREIGN PATENT DOCUMENTS

EP 1103511 B1 5/2001

(Continued)

OTHER PUBLICATIONS

The Examiner created a drawing showing the relationship of a horizontal line, a vertical line, a hypotenuse line (the boom) and a vehicle inclination angle which together represent a simplified trianglar relationship of a mobile crane for lifting a load using a cable or a rope.*

(Continued)

*Primary Examiner*—Bentsu Ro
(74) *Attorney, Agent, or Firm*—Foley & Lardner LLP

(57) ABSTRACT

A mobile lift device having a load moving device capable of engaging a load is provided. The mobile lift device includes one or more systems for stabilizing the mobile lift device during operation of the load moving device. According to one exemplary embodiment, the mobile lift device is a heavy duty wrecker having a rotatable boom assembly. The heavy duty wrecker comprises a monitoring system for stabilizing the wrecker during operation of the boom assembly. The monitoring system comprises a plurality of sensors and a monitoring circuit coupled to the sensors to generate a force signal representative of at least one force being applied to the wrecker based upon the transmitted signals.

28 Claims, 10 Drawing Sheets

U.S. PATENT DOCUMENTS

| | | | | |
|---|---|---|---|---|
| 3,909,040 | A | | 9/1975 | Visser |
| 3,945,666 | A | | 3/1976 | Fritsch |
| 3,958,702 | A | | 5/1976 | Hand |
| 3,958,813 | A | | 5/1976 | Carey |
| 3,965,733 | A | | 6/1976 | Hutchings et al. |
| 3,981,514 | A | | 9/1976 | Visser |
| 3,987,906 | A | | 10/1976 | Kirsten |
| 4,039,084 | A | | 8/1977 | Shinohara et al. |
| 4,078,668 | A | | 3/1978 | Hohmann |
| 4,098,410 | A | | 7/1978 | Nixon et al. |
| 4,124,226 | A | | 11/1978 | Phillips |
| 4,212,006 | A | | 7/1980 | Cakebread et al. |
| 4,216,868 | A | | 8/1980 | Geppert |
| 4,222,491 | A | | 9/1980 | Geppert |
| 4,395,706 | A | * | 7/1983 | Garber ........................ 340/685 |
| 4,434,901 | A | | 3/1984 | Gehl |
| 4,532,595 | A | | 7/1985 | Wilhelm |
| 4,895,262 | A | | 1/1990 | Maso |
| 4,906,981 | A | | 3/1990 | Nield |
| 4,949,808 | A | | 8/1990 | Garnett |
| 5,058,752 | A | | 10/1991 | Wacht et al. |
| 5,160,055 | A | | 11/1992 | Gray |
| 5,160,056 | A | | 11/1992 | Yoshimatsu et al. |
| 5,163,570 | A | | 11/1992 | Mundis et al. |
| 5,217,126 | A | | 6/1993 | Hayashi et al. |
| 5,251,768 | A | | 10/1993 | Yoshimatsu et al. |
| 5,297,019 | A | | 3/1994 | Zuehlke |
| 5,359,516 | A | | 10/1994 | Anderson |
| 5,538,149 | A | | 7/1996 | Martin |
| 5,557,526 | A | | 9/1996 | Anderson |
| 5,645,181 | A | | 7/1997 | Ichiba et al. |
| 5,711,440 | A | | 1/1998 | Wada |
| 5,732,835 | A | | 3/1998 | Morita et al. |
| 6,092,975 | A | | 7/2000 | Cannon, Jr. et al. |
| 6,170,681 | B1 | | 1/2001 | Yoshimatsu |
| 6,202,013 | B1 | | 3/2001 | Anderson et al. |
| 6,230,090 | B1 | | 5/2001 | Takahashi et al. |
| 6,269,635 | B1 | | 8/2001 | Zuehlke |
| 6,385,518 | B1 | | 5/2002 | Rickers et al. |
| 6,496,766 | B1 | | 12/2002 | Bernold et al. |
| 6,536,615 | B2 | | 3/2003 | Nishikino et al. |
| 6,611,746 | B1 | | 8/2003 | Nagai |
| 6,655,219 | B2 | | 12/2003 | Saitoh et al. |
| 6,735,486 | B2 | | 5/2004 | Hoffelmeyer et al. |
| 6,744,372 | B1 | | 6/2004 | Shaw et al. |
| 6,779,961 | B2 | | 8/2004 | Barney et al. |
| 6,785,597 | B1 | | 8/2004 | Farber et al. |
| 6,843,383 | B2 | | 1/2005 | Schneider et al. |
| 6,894,621 | B2 | | 5/2005 | Shaw |
| 2001/0032826 | A1 | | 10/2001 | Nishikino et al. |
| 2002/0008075 | A1 | | 1/2002 | Handroos et al. |
| 2002/0144968 | A1 | | 10/2002 | Ruddy |
| 2003/0173151 | A1 | * | 9/2003 | Bodtke et al. ................. 182/18 |
| 2003/0173324 | A1 | | 9/2003 | Puszkiewicz et al. |
| 2004/0000530 | A1 | | 1/2004 | Yahiaoui et al. |
| 2005/0072965 | A1 | | 4/2005 | Sanders et al. |

FOREIGN PATENT DOCUMENTS

| | | | |
|---|---|---|---|
| EP | 1120376 | B1 | 8/2001 |
| JP | 02045242 | | 2/1990 |
| WO | WO 00/66479 | A1 | 11/2000 |

OTHER PUBLICATIONS

International Search Report for PCT/US2007/080854, date of mailing Feb. 6, 2008, 2 pages.

Written Opinion for PCT/US2007/080854, date of mailing Feb. 6, 2008, 8 pages.

International Search Report for PCT/US2006/042197, date of mailing Apr. 12, 2007, 3 pages.

Written Opinion for PCT/US2006/042197, date of mailing Apr. 12, 2007, 5 pages.

International Search Report and Written Opinion for Application No. PCT/US2006/042197, mailing date Apr. 12, 2007, 8 pages.

* cited by examiner

SECTION G-G

SECTION I-I

SECTION F-F

SECTION H-H

SECTION E-E

SYSTEM FOR MONITORING LOAD AND ANGLE FOR MOBILE LIFT DEVICE

REFERENCES

This is a continuation-in-part of application Ser. No. 11/244,414, filed on Oct. 5, 2005, and entitled “Mobile Lift Device.”

FIELD OF THE INVENTION

The present invention relates generally to the field of mobile lift devices. More specifically, the present invention relates to mobile lift devices having a load moving device (e.g., an extendible and rotatable boom assembly, etc.) and one or more systems for assisting in the stabilization of the mobile lift device during operation of the load moving device.

BACKGROUND

Various types of mobile lift devices are used to engage and support loads in a wide variety of environments. The primary purpose of many mobile lift devices is to move a load from a first position to a second position, whether by sliding or lifting the load. In particular, mobile lift devices may be used for hoisting, towing, and/or manipulating a load, such as a disabled vehicle, a container, or any other type of load. Mobile lift devices incorporating a load moving device, such as wreckers having a rotatable boom assembly, generally include devices for stabilizing the mobile lift device during operation of the load moving device. In the use of mobile lift devices, it is typically assumed that the load being manipulated will be directly beneath the boom assembly. However, in cases when the load is not positioned directly beneath the boom assembly or when the load may potentially compromise the stability of the mobile lift device, it should be advantageous to develop a mobile lift device having one or more systems for assisting in the stabilization of the mobile lift device when the load moving device is engaging a load.

Accordingly, there is a need for an improved mobile lift device having a monitoring system for monitoring the force exerted on the mobile lift device. There is also a need for an improved mobile lift device having a cable and one or more angle sensors coupled to a monitoring system, in order to generate a signal representative of the angle of the cable relative to the mobile lift device. There is also a need for an improved mobile lift device having a load moving device with one or more sheaves supported at the distal end of the load moving rotatable in at least two axis. There is also a need for an improved mobile lift device having a load moving device that is coupled to a rotator to permit the load moving device to rotate about at least two axis relative to the mobile lift device. There is also a need for a mobile lift device having an improved front outrigger system capable of achieving a relatively low profile when in an extended position. There is also a need for a mobile lift device having an improved front outrigger system that can be positively locked when in a fully extended position. There is also a need for a mobile lift device having an improved front outrigger system that is capable of stabilizing the mobile lift device in both a lateral direction and a fore and aft direction. There is also a need for a mobile lift device having an improved front outrigger system that can fully retract into the body of the mobile lift device when in a stowed or transport position.

It would be desirable to provide a mobile lift device that provides one or more of these or other advantageous features as may be apparent to those reviewing this disclosure. The teachings disclosed extend to those embodiments which fall within the scope of the appended claims, regardless of whether they accomplish one or more of the above-mentioned needs.

SUMMARY OF THE INVENTION

One embodiment of the invention pertains a monitoring system for monitoring a force at a load moving device. The load moving device uses at least one cable attached to a load to lift or slide the load. A monitoring system, in accordance with one embodiment of the present invention, includes a first and second angle sensor, wherein the sensors are configured to generate a first and second angle signal, respectively, representative of a first and second angle of the cable relative to the device. The monitoring system further includes a monitoring circuit coupled to the first and second angle sensors to generate a force signal representative of at least one force being applied to the load moving device based upon the angle signals.

Another embodiment of the present invention pertains to a mobile lift device. The mobile lift device, in accordance with an embodiment of the present invention, includes a chassis for movement over a surface, a rotator supported by the chassis, and a boom coupled to the rotator to permit the boom to pivot about at least two axes relative to the chassis. The boom is coupled to a first hydraulic operator, in order to pivot the boom relative to the rotator. A second hydraulic operator is coupled to the rotator to rotate the rotator relative to the chassis. A plurality of outriggers is coupled to the chassis to provide stabilization of the chassis during load handling. A sheave is supported at the distal end of the boom, such that the sheave is rotatably supported to rotate about at least two axes relative to the boom. The mobile lift device further includes a first winch or hoist supported at the rotator, a cable supported by the first winch and the first sheave, a first and second angle sensor, wherein the sensors are configured to generate a first and second angle signal, respectively, representative of a first and second angle of the cable relative to the device, and a monitoring circuit coupled to the first and second angle sensors to determine at least one force applied to the device based at least upon the angle signals and determining whether the force is sufficient to tip or overload the mobile lift device.

A further embodiment of the present invention pertains to a tow vehicle for handling loads such as disabled automobiles, trucks and equipment. The tow vehicle, in accordance with an embodiment of the present invention, includes a chassis, a rotator supported by the chassis, and an extendable boom coupled to the rotator to permit the boom to pivot about at least two axes relative to the chassis. The boom is extendable between a first length and a second length. The boom is coupled to a first hydraulic operator, in order to pivot the boom relative to the rotator. A second hydraulic operator is coupled to the rotator to rotate the rotator relative to the chassis. A plurality of outriggers is coupled to the chassis to provide stabilization of the chassis during load handling. A first sheave is supported at the distal end of the boom, such that the first sheave is rotatably supported to rotate about at least two axes relative to the boom. A second sheave is also supported at the distal end of the boom proximate the first sheave, wherein the second sheave is also rotatably supported to rotate about at least two axes relative to the boom. The tow vehicle further includes a first and second winch or hoist supported at the rotator, a first and second cable supported by the first and second winches and the first and second sheaves, respectively, a first and second angle sensor, wherein the sensors are configured to generate a first and second angle signal, respectively, representative of a first and second angle of the cable relative to the boom, and a monitoring circuit coupled to the first and second angle sensors to determine at least one force applied to the vehicle based at least upon the angle signals and determining whether the force is sufficient to tip or overload the tow vehicle.

DETAILED DESCRIPTION OF EXEMPLARY EMBODIMENTS

Figure 1:
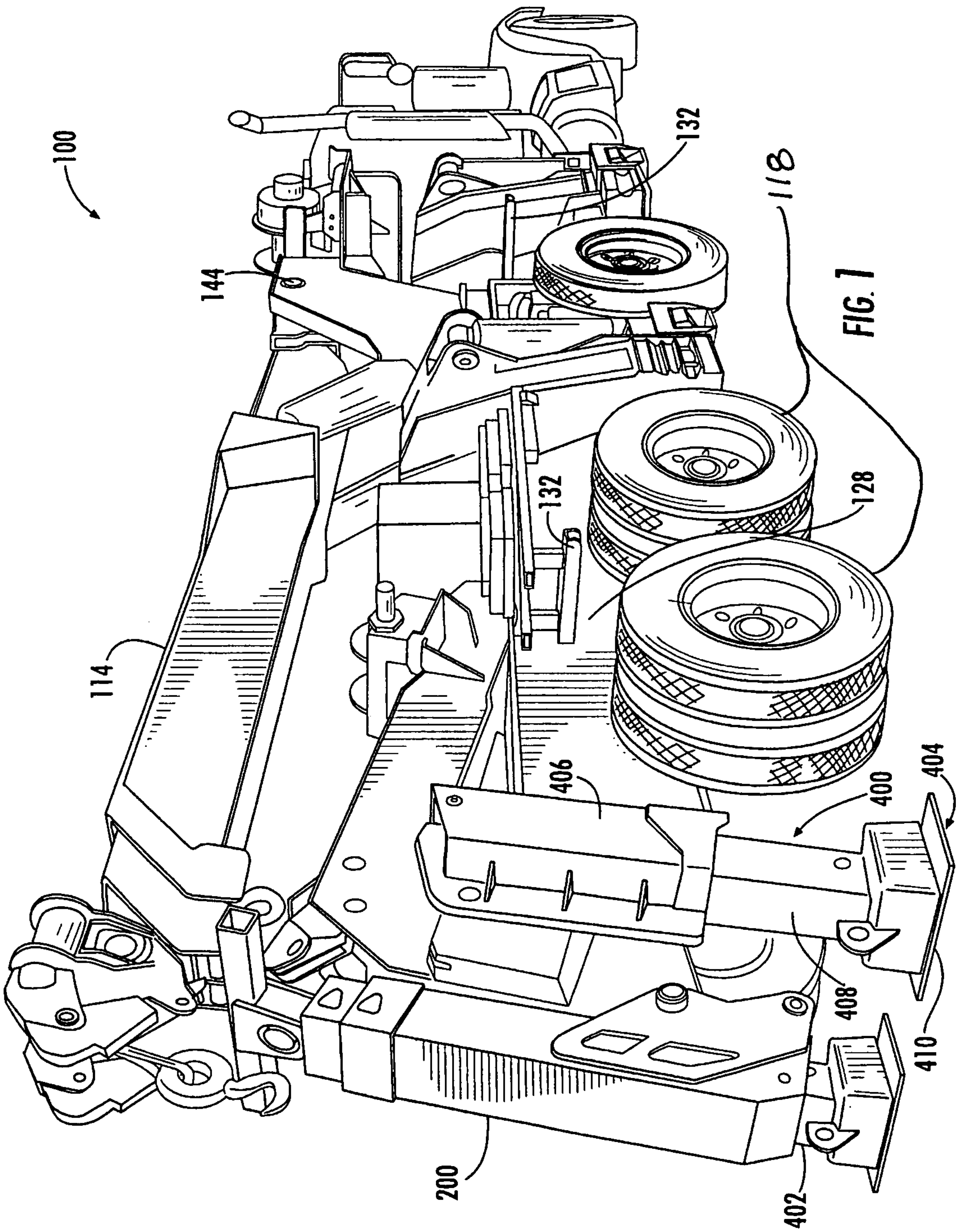
FIG. 1 is a perspective view of a mobile lift device according to an exemplary embodiment.

FIGS. 1 through 6 show one nonexclusive exemplary embodiment of a mobile lift device (e.g., rotator, recovery vehicle, tow truck, crane, etc.) shown as a wrecker 100. Wrecker 100 is a heavy-duty wrecker having a load moving device (e.g., an extensible and rotatable boom assembly 114, etc.) configured to engage and support a load. For example, the load moving device may be capable of hoisting, towing, and/or manipulating a disabled vehicle (e.g., an overturned truck, etc.), a container, and/or any other type of load. To assist in stabilizing the wrecker 100 (e.g., prevent the wrecker 100 from tipping or becoming otherwise unbalanced, etc.) when a load is engaged and/or when the load moving device is positioned such that the stability of the wrecker 100 is threatened, the wrecker 100 includes one or more systems for stabilizing the wrecker 100. For example, the wrecker 100 includes a front outrigger system 300 (shown in FIG. 3) and/or a rear outrigger system 400.

It should be understood that, although the systems for stabilizing the mobile lift device (e.g., the front outrigger system 300, the rear outrigger system 400, etc.) will be described in detail herein with reference to the wrecker 100, one or more of the systems for stabilizing the mobile lift device disclosed herein may be applied to, and find utility in, other types of mobile lift devices as well. For example, one or more of the systems for stabilizing the mobile lift device may be suitable for use with mobile cranes, backhoes, bucket trucks, emergency response vehicles (e.g., firefighting vehicles having extensible ladders, etc.), or any other mobile lift device having a boom-like mechanism configured to support a load.

Figure 4:
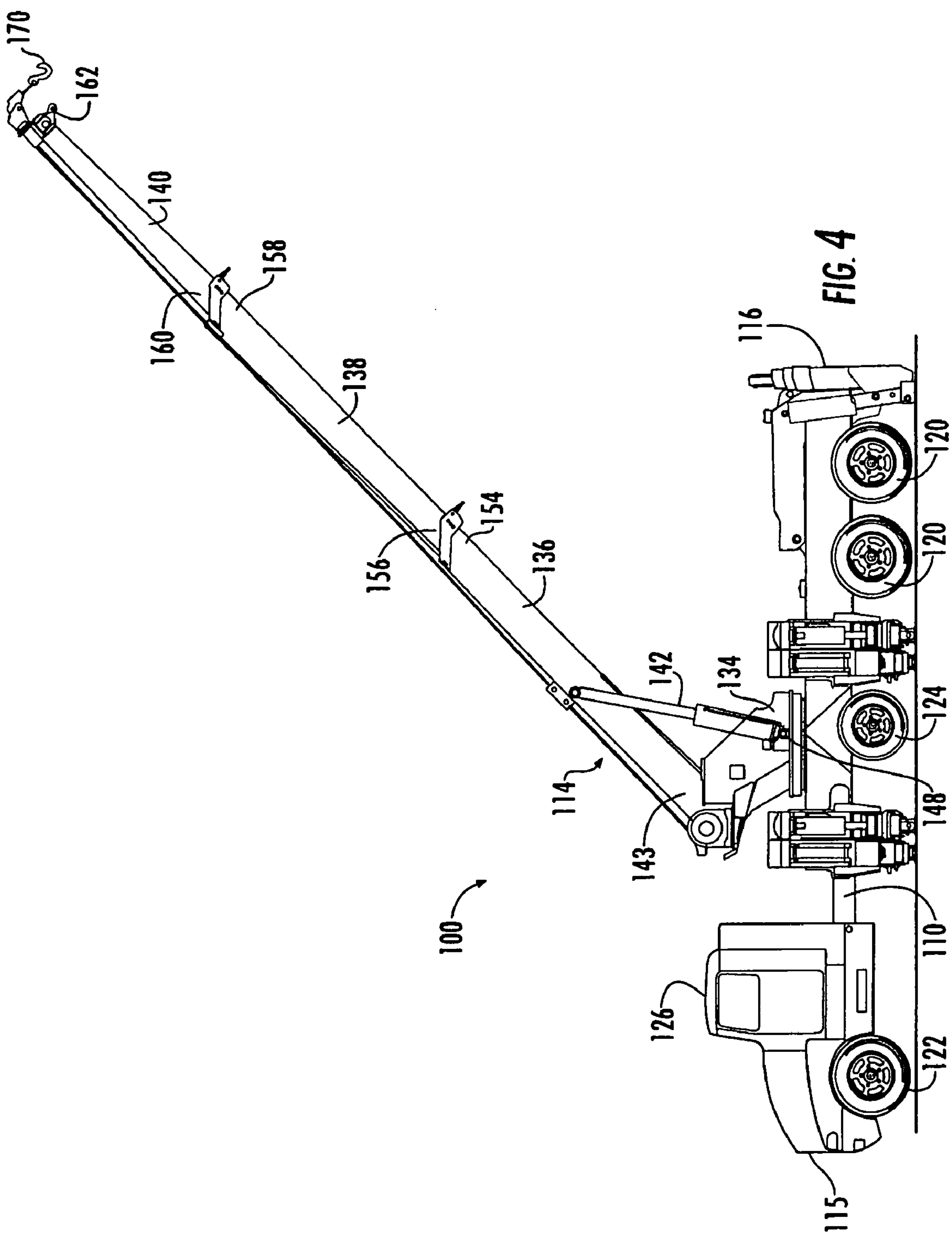
FIG. 4 is side view of the mobile lift device shown in FIG. 1.

Referring first to FIG. 4, the wrecker 100 is shown as generally including a platform or chassis 110 functioning as a support structure for the components of the wrecker 100 and is typically in the form of a frame assembly. According to an exemplary embodiment, the chassis 110 generally includes first and second frame members (not shown) that are arranged as two generally parallel chassis rails extending in a fore and aft direction between a first end 115 (a forward portion of the wrecker 100) and a second end 116 (a rearward portion of the wrecker 100). The first and second frame members are configured as elongated structural or supportive members (e.g., a beam, channel, tubing, extrusion, etc.). The first and second frame members are spaced apart laterally and define a void or cavity (not shown). The cavity, which generally constitutes the centerline of the wrecker 100, may provide an area for effectively concealing or otherwise mounting certain components of the wrecker 100 (e.g., the underlift system 200, etc.).

A plurality of drive wheels 118 are rotatably coupled to the chassis 110. The number and/or configuration of the wheels 118 may vary depending on the embodiment. According to the embodiment illustrated, the wrecker 100 utilizes twelve wheels 118 (two tandem wheel sets 120 at the second end 116 of the wrecker 100, one wheel set 122 at the first end 115 of the wrecker 100, and one wheel set 124 substantially centered along the chassis 110 in the fore and aft direction). In this configuration, the wheel set 122 at the first end 115 is steerable while the wheels sets 120 are configured to be driven by a drive apparatus. According to various exemplary embodiments, the wrecker 100 may have any number of wheel configurations including, but not limited to, four, eight, or eighteen wheels.

The wrecker 100 is further shown as including an occupant compartment or cab 126 supported by the chassis 110 that includes an enclosure or area capable of receiving a human operator or driver. The cab 126 is carried and/or supported at the first end 115 of the chassis 110 and includes controls associated with the manipulation of the wrecker 100 (e.g., steering controls, throttle controls, etc.) and optionally may include controls for the load moving device, the monitoring system 500, the boom assembly 114, the front outrigger system 300, the rear outrigger system 400, and/or the underlift system 200.

Figure 2:
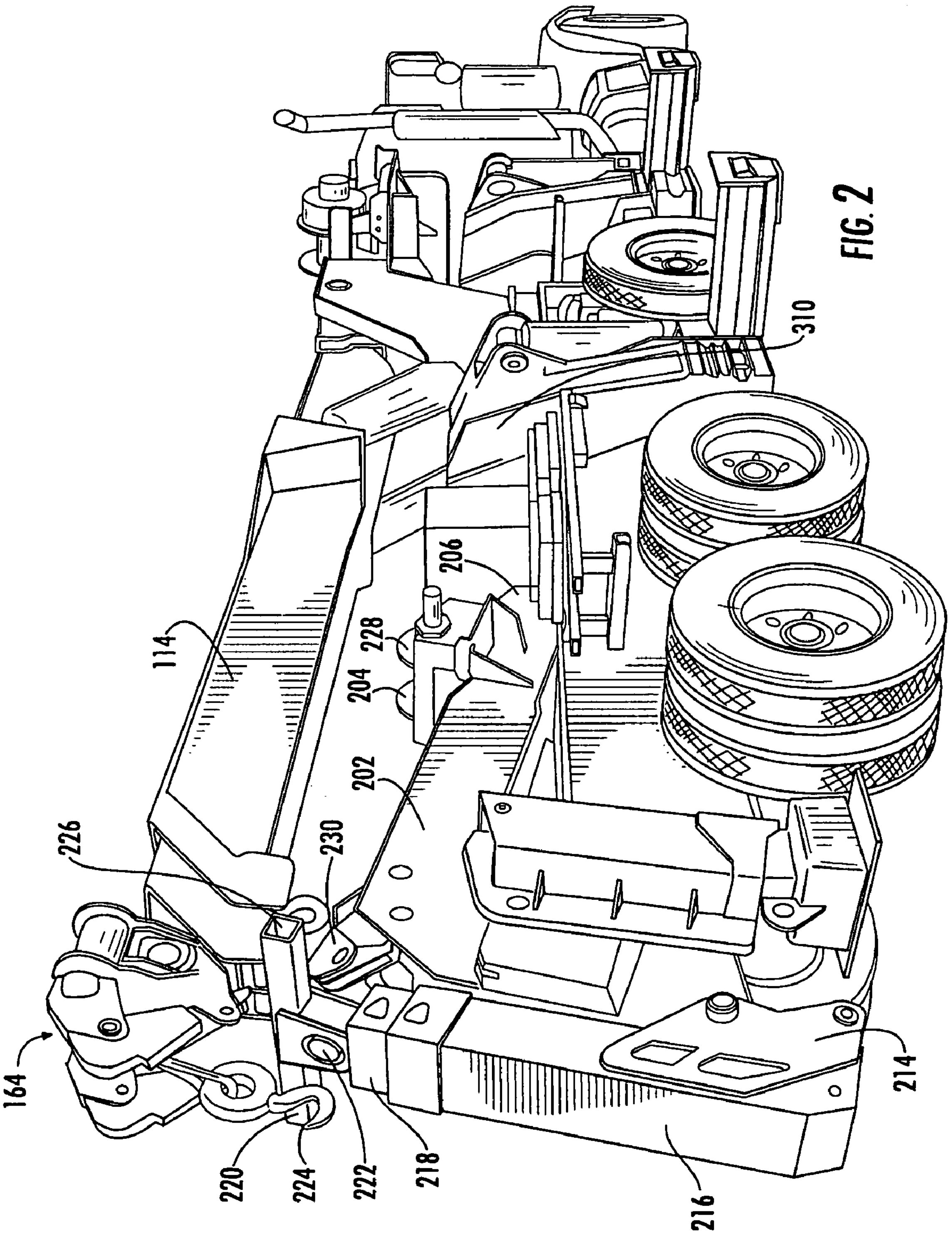
FIG. 2 is another perspective view of the mobile lift device shown in FIG. 1.
Figure 3:
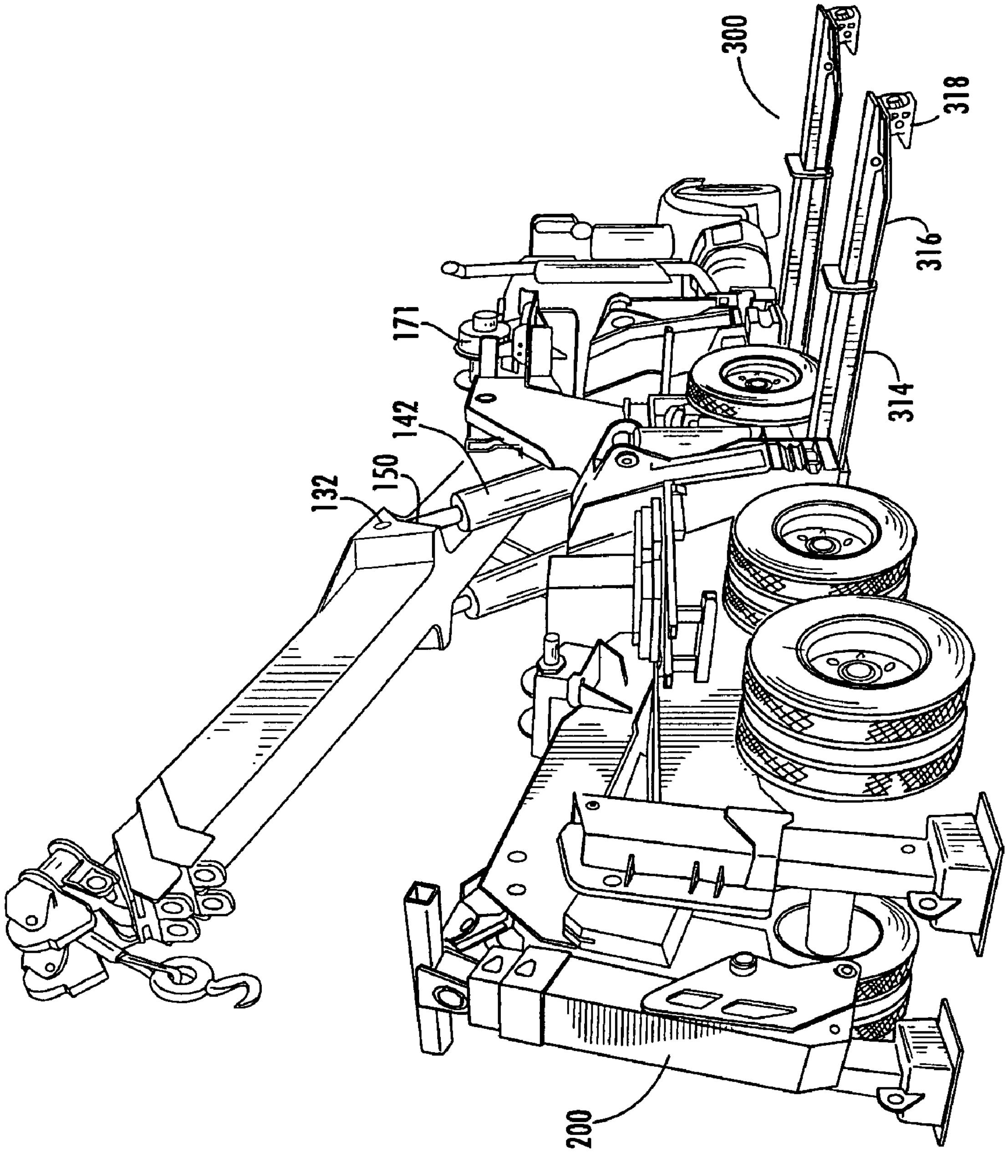
FIG. 3 is another perspective view of the mobile lift device shown in FIG. 1.

Referring to FIGS. 1 through 3, mounted to the chassis 110 is a sub-frame assembly 128. According to an exemplary embodiment, the sub-frame assembly 128 generally includes first and second frame members 130 that are arranged as two generally parallel rails extending in a fore and aft direction between an area behind the cab 126 and the second end 116 of the wrecker 100. The first and second frame members 130 are configured as elongated structural or supportive members (e.g., a beam, channel, tubing, extrusion, etc.) and are generally fixed to the first and second frame members of the chassis 110. According to an exemplary embodiment, the first and second frame members 130 are formed of a higher strength steel than conventionally used for wrecker sub-frames. According to a preferred embodiment, the first and second frame members 130 are formed of a steel having a strength of approximately 130,000 pounds square inch (psi). Forming the first and second frame members 130 of such a material allows the overall weight of the wrecker 100 to be reduced. Preferably, other substantial components of the wrecker 100, including but not limited to the boom assembly 114, the underlift system 200, the front outrigger system 300, and the rear outrigger system 400, are formed of the same material.

According to various alternative embodiments, the first and second frame members 130 and/or other components of the wrecker 100 may be formed of any other suitable material.

Each frame member 130 of the sub-frame assembly 128 is shown as including one or more support brackets 132 outwardly extending in a directional substantially perpendicular to the frame members 130. The support brackets 132 can be used to support body panels (not shown), for example by inserting the body panels over the support brackets 132 and coupling the body panels thereto. Such body panels may include one or more storage compartments for retaining accessories, tools, and/or supplies. The support brackets 132 can also be used to support a user interface system having controls associated with the manipulation of one or more features (e.g., the load moving device, the underlift system, the outriggers, and/or the rear stakes, etc.) of the wrecker 100.

The load moving device is generally mounted on the sub-frame assembly 128 and supported by the chassis 110. According to the exemplary embodiment illustrated, the load moving device is in the form of an extensible and rotatable boom assembly 114. The boom assembly 114 is configured to support a load bearing cable having an engaging device (e.g., a hook, etc.) coupled thereto. The boom assembly 114 generally is mounted to a turntable or turret 134, a first or base boom section 136, one or more telescopically extensible boom sections (shown as a second boom section 138 and a third boom section 140), a first actuator device 142 for adjusting the angle of the base boom section 136 relative to the chassis 110, and one or more second actuator devices (not shown) for extending and retracting the one or more telescopically extensible boom sections relative to the base boom section 136.

The turret 134 supports the boom sections 136-140 and is mounted on the sub-frame assembly 128 in a manner that allows for the rotational (e.g., swinging, etc.) movement of the boom section 136-140 about a vertical axis relative to the chassis 110. The turret 134 can be rotated relative to the sub-frame assembly 128 by a rotational actuator or drive mechanism (e.g., a rack and pinion mechanism, a motor driven gear mechanism, etc.), not shown, to rotate the boom sections 136-140 about the vertical axis. According to an exemplary embodiment, the turret 134 is configured to rotate a full 360 degrees about the vertical axis relative to the chassis 110. According to other exemplary embodiments, the turret 134 may be configured to rotate about the vertical axis within any of a number predetermined ranges. For example, it may be desirable to limit rotation of the turret 134 to less than 360 degrees because the configuration of the cab 126, or some other vehicle component, may interfere with a complete rotation of 360 degrees.

A bottom end 143 of the first boom section 136 is pivotally coupled to the turret 134 about a pivot shaft 144. The first boom section 136 is movable about the pivot shaft 144 between an elevated use or load engaging position (shown in FIG. 3) and a retracted stowed or transport position (shown in FIG. 1). According to an exemplary embodiment, the base boom section 136 is capable of elevating to a maximum angle of approximately 50 degrees relative to the chassis 114 (see FIG. 4) and may be stopped at any angle within such range during operation. According to various exemplary embodiments, the base boom section 136 may be capable of elevating to a maximum angle greater than or less than 50 degrees.

Figure 6:
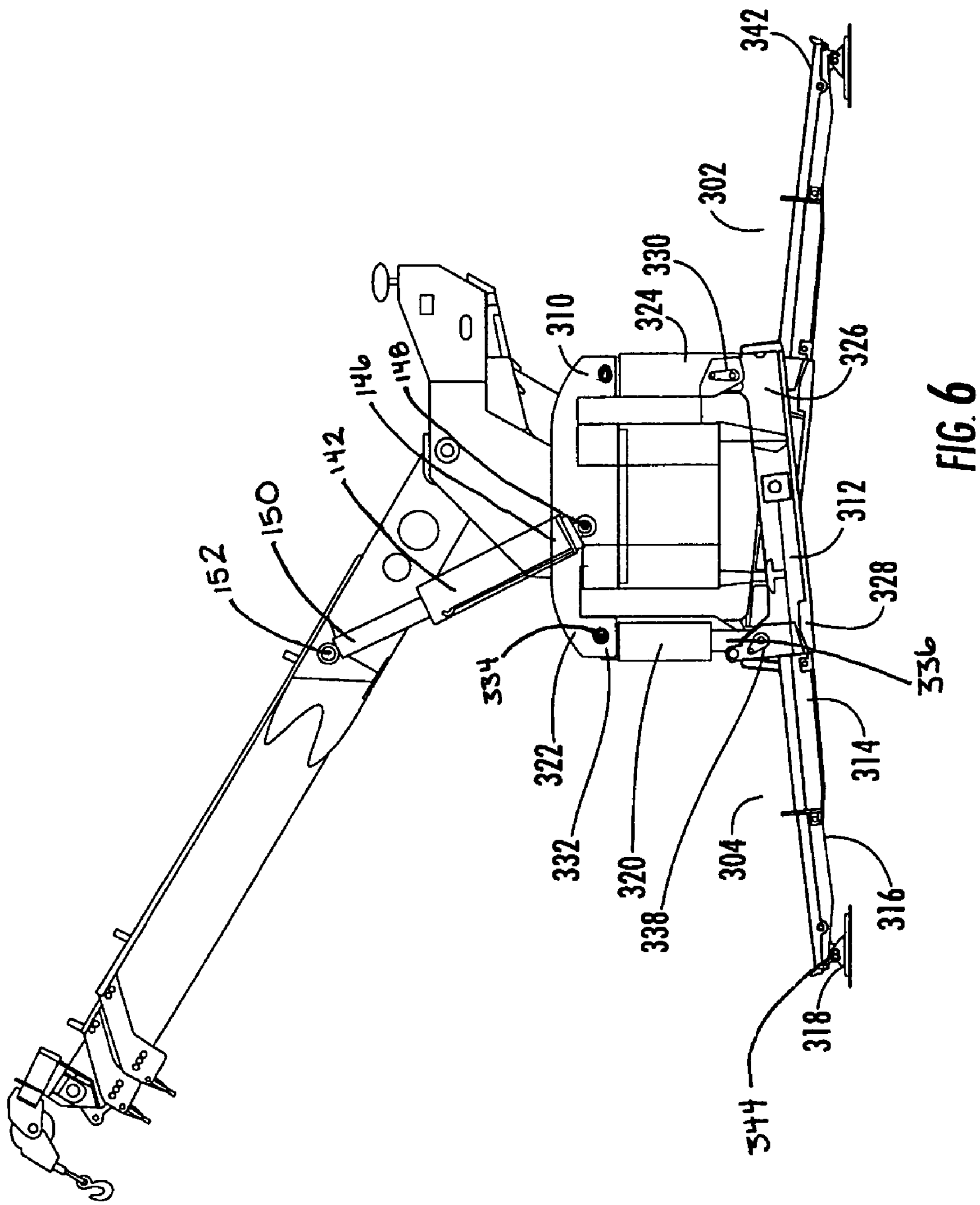
FIG. 6 is a rear view of the mobile lift device shown in FIG. 1.
Figure 6A:
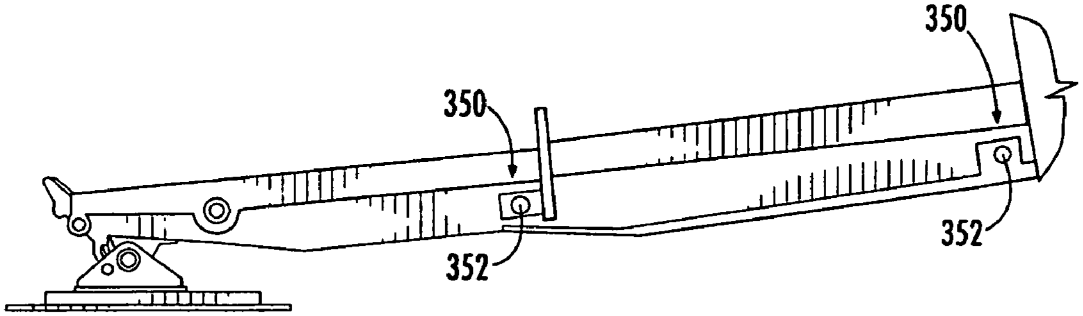
FIG. 6*a* is a partial detailed view of a front outrigger system shown in FIG. 6.
Figure 6B:
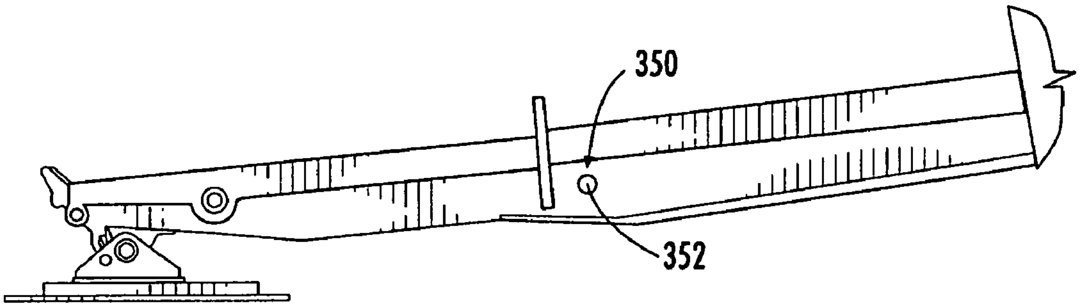
FIG. 6*b* is a partial detailed view of a front outrigger system shown according to another exemplary embodiment.

Elevation of the base boom section 136 is achieved using the first actuator device 142. According to the embodiment illustrated, the first actuator device 142 is a hydraulic actuator device. For example, as shown in FIGS. 3 and 6, the first actuator device 142 comprises a pair of hydraulic cylinders disposed on opposite sides of the base boom section 136. Each hydraulic cylinder has a first end 146 pivotally coupled to the turret 134 about a pivot shaft 148 and a second end 150 pivotally coupled to the first boom section 136 about a pivot shaft 152. Although two hydraulic cylinders are shown in the FIGURES, according to various exemplary embodiments, a single hydraulic cylinder may be used, or any number greater than two. It should further be noted that the first actuator device 142 is not limited to hydraulic actuator devices and can be any other type of actuator capable of producing mechanical energy for exerting forces suitable to support the load acting on the load moving device. For example, the first actuator device 142 can be pneumatic, electrical, and/or any other suitable actuator device.

The base boom section 136 is preferably a tubular member having a second end 154 configured to receive a first end 156 of the second boom section 138. Similarly, a second end 158 of the second boom section 138 is configured to receive a first end 160 of the third boom section 140. The second and third boom sections 138 and 140 are configured for telescopic extension and retraction relative to the base boom section 136. The telescopic extension and retraction of the second and third boom sections 138 and 140 is achieved using one or more of the second actuator devices (not shown). According to an exemplary embodiment, hydraulic cylinders contained within the base boom section 136 and the second boom section 138 provide for the telescopic extension and retraction of the second and third boom sections 138 and 140. Although a three stage extensible boom assembly 114 (i.e., a boom assembly having three boom sections) is shown, in other exemplary embodiments the boom assembly 114 may include any number of boom sections (e.g., one, four, etc.). Regardless of the number of boom sections, the free end or end-most portion of the furthest boom section, for purposes of this disclosure, is referred to as a distal end 162.

Figure 7:
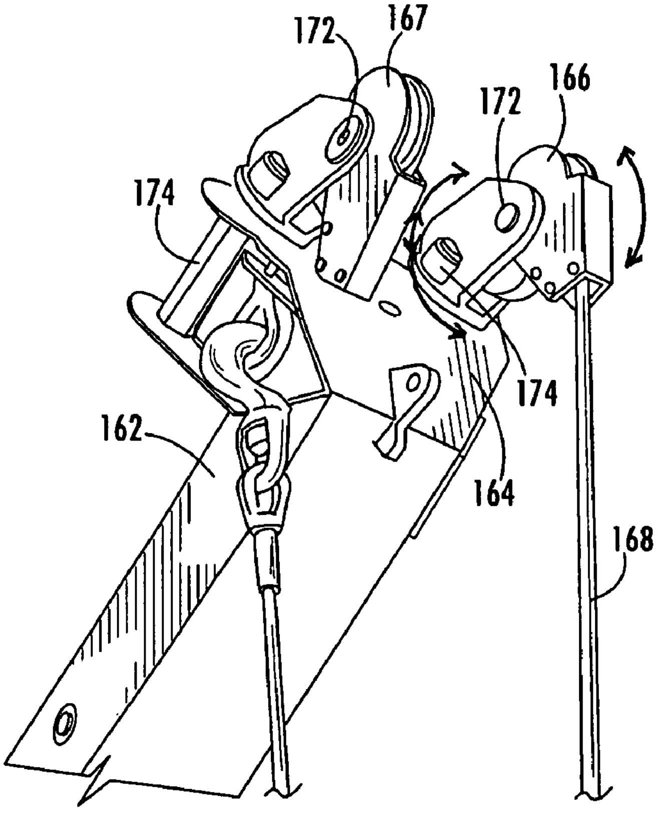
FIG. 7 is perspective view of a distal end of a boom assembly according to an exemplary embodiment.

Referring to FIG. 7, the distal end 162 of the furthest boom section (e.g., the third boom section 140, etc.) includes a boom tip 164 carrying one or more rotatable sheaves (shown as a first sheave 166 and a second sheave 167). According to the embodiment illustrated, the first sheave 166 and the second sheave are carried by the boom tip 164. The first sheave 166 is positioned proximate to the second sheave 166 and spaced apart in a lateral direction. A separate load bearing cable 168 passes over each of the sheaves 166 and 167 and supports a hook 170 (shown in FIG. 4) or other grasping element used for engaging the load. Each of the sheaves 166 and 167 are shown as having a shield 169 to assist in guiding the load bearing cable 168 as it passes over the respective sheave 166 and 167. A pair of winches 171 (shown in FIG. 3) are included for operative movement of each load bearing cable 168. The sheaves 166 and 167 are preferably configured to rotate about at least two axes relative to the boom, but alternatively may be configured to rotate about only a single axis. According to the embodiment illustrated, the sheaves 166 and 167 are configured to rotate about a first axis defined by a pivot shaft 172 and a second axis defined by a pivot shaft 174. In such an embodiment, the first axis of rotation is substantially perpendicular to the second axis of rotation. In addition, the first axis of the first sheave 166 may be concentrically aligned with the first axis of the second sheave 167 or offset from the first axis of the second sheave 167.

Referring further to FIGS. 1 through 3, the wrecker 100 further comprises a wheel lift or underlift system 200 for lifting and towing a vehicle by engaging the frame an/or one or more wheels of the vehicle to be towed. The underlift system 200 is provided at the second end 116 of the chassis 110 and is movable between a retracted stowed position (shown in FIG. 1) and an extended use position (not shown). According to the embodiment illustrated, the underlift system 200 generally includes a supporting member 202 pivotally coupled at its front end 204 by a pivot shaft 206 to the chassis 110 or the sub-frame assembly 128. An actuator device is provided for rotating the supporting member 202 about the pivot shaft 206 between the use position and the stowed position. As shown, the actuator device comprises a hydraulic cylinder 208 pivotally coupled at a first end 210 to the chassis 110 and pivotally coupled at a second end 212 to the supporting member 202.

The underlift system 200 further includes a bracket 214 coupled to an opposite end of the supporting member 202. The bracket 214 is pivotally coupled to the supporting member 202 and is fixedly coupled to a first or base boom section 216. Pivotally coupling the bracket 214 to the supporting member 202 allows the base boom section 216 to be pivotally supported relative to the supporting member 202 thereby allowing the base boom section 216 to move between a stowed position, wherein the base boom section 216 is substantially parallel with the second end of the supporting member 202, and a use position, wherein the base boom section 216 is substantially perpendicular to the second end of the supporting member 202.

One or more extension boom sections (shown as a second boom section 218) are telescopically extendable, for example via hydraulic cylinders, from the base boom section 216. A cross bar member 220 is pivotally mounted at its center 222 to a distal end of the outermost extension boom section (e.g., the second boom section 218, etc.). The cross bar member 220 includes ends 224 and 226 which may be configured to engage the frame of the vehicle to be carried and/or which may be configured to receive a vehicle engaging mechanism (not shown) for engaging the frame and/or wheels of a vehicle being carried, such as a wheel cradle.

The underlift system 200 is further shown as including a winch 228 supported at the front end 204 of the supporting member 202. The winch 228 controls the movement of a cable (not shown) extending from the winch 228 to a rotatable sheave 230. A free end of the cable is configured to support a grasping element (e.g., a hook, etc.) that may assist in the recovery of a vehicle being towed.

The wrecker 100 is further shown as including a front outrigger system 300 for stabilizing the wrecker 100 during operation of the boom assembly 114, particularly when operation of the boom assembly 114 is outwardly of a side of the wrecker 100. The outrigger system 300 generally includes two outriggers (shown as a first outrigger 302 and a second outrigger 304) which are extensible from a right side 117 (i.e., passenger's side) and a left side 119 (i.e., driver's side) of the wrecker 100 respectively. The first outrigger 302 and the second outrigger 304 are selectively movable between a retracted stowed or transport position (shown in FIG. 1) and an extended use or stabilizing position (shown in FIG. 3). An intermediate position of the outriggers 302 and 304 is shown in FIG. 2. The outriggers 302 and 304 are coupled such that the outriggers 302 and 304 extend across the chassis 110 (e.g., across the underside or bottom of the chassis 110, etc.) so that when deployed, the outriggers 302 and 304 angle or slope downward from the chassis 110 and assume a criss-cross or X-like configuration (shown in FIG. 6).

With the first and second outriggers 302 and 304 in the extended position, the outrigger system 300 provides a wider base or stance for stabilizing the wrecker 100. The outrigger system 300 is capable of stabilizing the wrecker 100 in a lateral direction as well as a fore and aft direction. The stabilizing position achieved by the outrigger system 300, in comparison to the stabilizing position achieved by front outrigger systems conventionally used on wreckers which typically comprise a first support member outwardly extending from a side of the wrecker in a horizontal direction and a second support member extending downward in a vertical direction from a free end of the first support member, advantageously reduces the profile of the outrigger system 300 in an area surrounding the wrecker 100. This reduced profile allows personnel to move more efficiently around the wrecker 100 when the first and second outriggers 302 and 304 are extended.

Figure 5:
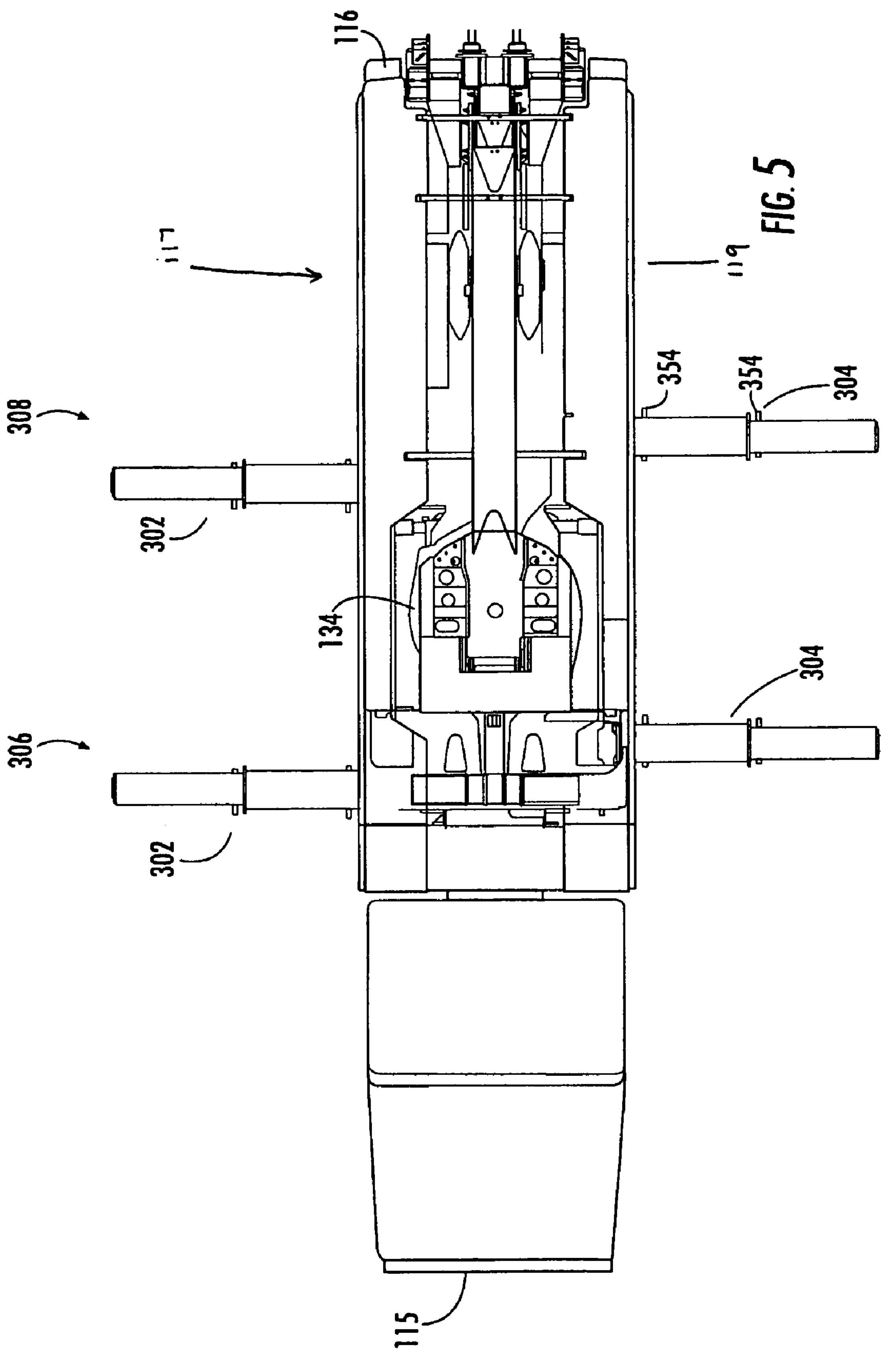
FIG. 5 is a top view of the mobile lift device shown in FIG. 1.

FIG. 5 is a top view of the wrecker 100 and shows the first outrigger 302 being positioned adjacent to and forward of the second outrigger 304. Positioning the first outrigger 302 adjacent to the second outrigger 304 may assist in stabilizing the wrecker in a fore and aft direction by providing additional rigidity to the outriggers. According to various alternative embodiments, the first outrigger 302 may be spaced apart from the second outrigger 304 in the fore and aft direction and/or may be positioned rearward of the second outrigger 304. FIG. 5 also shows the wrecker 100 as including two pairs of front outriggers along the chassis 110, a first pair 306 positioned forward of the turret 134 and a second pair 308 positioned rearward of the turret 134. Such positioning provides improved stability in comparison to using a single pair of outriggers. According to various alternative embodiments, any number of outriggers may be provided, at any of a number of positions, along the chassis 110 for stabilizing the wrecker 100.

The configuration of the first and second outriggers 302 and 304 is substantially identical except that they outwardly extend from opposite sides of the wrecker 100. Accordingly, for brevity, only the configuration of the second outrigger 304 is described in detail herein. Referring to FIGS. 1 through 3, the second outrigger 304 generally includes an outrigger housing 310, a base support member 312, one or more extensible support members (shown as a first extension member 314 and a second extension member 316), a ground engaging portion 318, a first actuator device 320 for adjusting the angle of the base support member 312 relative to the chassis 110, and one or more second actuator devices (not shown) for extending and/or retracting the first extension member 314 and the second extension member 316. As will be later be described in detail, the outrigger system 300 may optionally include a locking device 350 for positively locking an extensible support member relative to the base support member 312 when in an extended position, such as a fully extended position, to prevent the extensible support member from inadvertently retracting or collapsing when a load is being engaged.

The outrigger housing 310 is mounted on the sub-frame assembly 128 and extends laterally above and around the chassis 110 between a first end 322 and a second end 324. The outrigger housing 310 is fixedly coupled to the sub-frame assembly 128 via a welding operation, a mechanical fastener (e.g., bolts, etc.), and/or any other suitable coupling technique. According to an exemplary embodiment, the outrigger housing 310 of the second outrigger 304 is further coupled to the outrigger housing of the first outrigger 302.

A first end 326 of the base support member 312 is coupled to the second end 324 of the outrigger housing 310 adjacent to a side of the wrecker 100 opposite to the side from which a second end 328 of the base support member 312 is to extend. According to the embodiment illustrated, the first end 326 of the base support member 312 is pivotally coupled to the second end 324 of the outrigger housing 310 about a pivot shaft 330. The base support member 312 extends laterally beneath the chassis 110 with the first end 326 provided on one side of the chassis 110 and the second end 328 provided on an opposite side of the chassis 110. Having the base support member 312 extend beneath the chassis 110 from one side of the chassis 110 to the other side of the chassis 110 increases the overall length of the outrigger system thereby providing improved stability.

The base support member 312 is movable about the pivot shaft 330 between a stowed position wherein the base support member 312 is substantially perpendicular to the chassis 110 and a stabilizing position wherein the base support member 312 is provided at an angle relative to the chassis 110 (e.g., angled or sloped downward from the chassis, etc.). According to an exemplary embodiment, the base support member 312 is capable of being moved to a position wherein the base support member 312 forms an angle with a ground surface that is between approximately 5 degrees and approximately 20 degrees. According to various exemplary embodiments, the base support member 312 may be capable of achieving other angles relative to a ground surface that are less than 5 degrees and/or greater than 20 degrees.

The orientation of the base support member 312 is achieved using the first actuator device 320. According to the embodiment illustrated, the first actuator device 320 is a hydraulic actuator device. For example, the first actuator device 320 is shown as a hydraulic cylinder having a first end 332 pivotally coupled to the first end 322 of the outrigger housing 310 about a pivot shaft 334 and a second end 336 pivotally coupled to the second end 328 of the base support member 312 about a pivot shaft 338. Although a single hydraulic cylinder is shown in the FIGURES, according to another exemplary embodiment, a multiple hydraulic cylinders may be used. It should further be noted that the first actuator device 320 is not limited to a hydraulic actuator device and can be any other type of actuator capable of producing mechanical energy for exerting forces suitable to moving the base support member 312 and supporting the load acting on the outrigger system 300 when engaging the ground and at least partially supporting the weight of the wrecker 100. For example, the first actuator device 320 can be pneumatic, electrical, and/or any other suitable actuator device.

The base support member 312 is preferably a tubular member and the second end 328 is configured to receive a first end of the first extensible member 314. Similarly, a second end 340 of the first extensible member 314 is configured to receive a first end of second extensible member 316. The first and second extensible members 314 and 316 are configured for telescopic extension and retraction relative to the base support member 312. The telescopic extension and retraction of the first and second extensible members 314 and 316 is achieved using one or more actuator devices (not shown). According to an exemplary embodiment, the support members each have a rectangular cross-section and hydraulic cylinders contained within the base support member 312 and the first extension member 314 provide the telescopic extension and retraction of the first and second extensible members 314 and 316. Although a three stage extensible outrigger system 300 (i.e., an outrigger system having three support members), in other exemplary embodiments the outrigger system 300 may include any number of support members (e.g., one, four, etc.).

For purposes of this disclosure, the free end or end-most portion of the furthest support member is referred to as a distal end 342. The distal end 342 of the furthest support member (e.g., the second extensible support member 316, etc.) includes a pivot shaft 344 for pivotally coupling the ground engaging portion 318 to the second outrigger 304. Pivotally coupling the ground engaging portion 318 to the distal end 342 allows the ground engaging portion 318 to provide a stable footing on uneven surfaces. The ground engaging portion 318 may optionally include a structure to facilitate engaging a surface and thereby reduce the likelihood that the wrecker 100 will undesirably slide or otherwise move in a lateral direction during operation of the boom assembly 114. For example, the ground engaging portion 318 may include one or more projections (e.g., teeth, spikes, etc.) configured to penetrate the surface for providing greater stability. It should also be noted that each of the first and second outriggers 302 and 304 may be operated independently of each other in such a manner that the wrecker 100 may be stabilized even when positioned on an uneven or otherwise non-uniform surface.

Referring to FIGS. 6 through **6*b*, the outrigger system 300 further includes the locking device 350 for selectively locking the telescoping support members in an extended position to prevent the support members from inadvertently collapsing or retracting when under a load. Before the boom assembly 114 is to engage a load, the first and second outriggers 302 and 304 are typically moved to an extended position wherein the extensible support members 314 and 316 are fully extended relative to the base support member 312. In the fully extended stabilizing position, the first actuator device 320 and the second actuator device of the outrigger system 300 are generally capable of exerting sufficient force to at least partially elevate the wrecker 100 and to maintain the wrecker 100 in such a position as the boom assembly 114 engages a load. However, to positively lock the support members in the fully extended position and thereby reduce the likelihood that the first and second outriggers 302 and 304 will inadvertently retract from an extended position, the locking device 350** is provided.

According to an exemplary embodiment, the locking device 350 comprises an aperture 352 extending at least partially through the extensible support member and a locking pin 354 (shown in FIG. 5) configured to be selectively inserted into the aperture 352 to positively lock the extensible support member in an extended position. According to the embodiment illustrated, an aperture 352 is provided on both the first extensible support member 314 and the second extensible support member 316. Insertion of the locking pin 354 in the aperture 352 formed in the first extensible support member 314 prevents the first extensible support member 314 from retracting relative to the base support member 312. Insertion of the locking pin 354 in the aperture 352 formed in the second extensible support member 316 prevents the second extensible support member 316 from retracting relative to the first extensible support member 314.

According to an exemplary embodiment, the apertures 352 are located near the first ends of the first and second extensible support members 314 and 316 and become accessible when the second outrigger 304 is in a fully extended position. According to various alternative embodiments, any number of apertures 352 may be located anywhere along the second outrigger 304. When the apertures 352 are accessible, a pair of locking pins 354 may be inserted to the apertures 352. A portion of the locking pins 354 outwardly extend from the side of the extensible support members to prevent the extensible support members from moving to the retracted position. According to another exemplary embodiment, as shown in FIG. **6*b*, the aperture 352 may be located such that it extends through both the outer support member (e.g., the base support member 312, etc.) and the inner support member (e.g., the first extensible support member 314, etc.). According to a further exemplary embodiment, a plurality of apertures 352 may be provided along the second outrigger 304 for allowing the second outrigger 304** to be selectively locked in positions other than a fully extended position.

Figure 8:
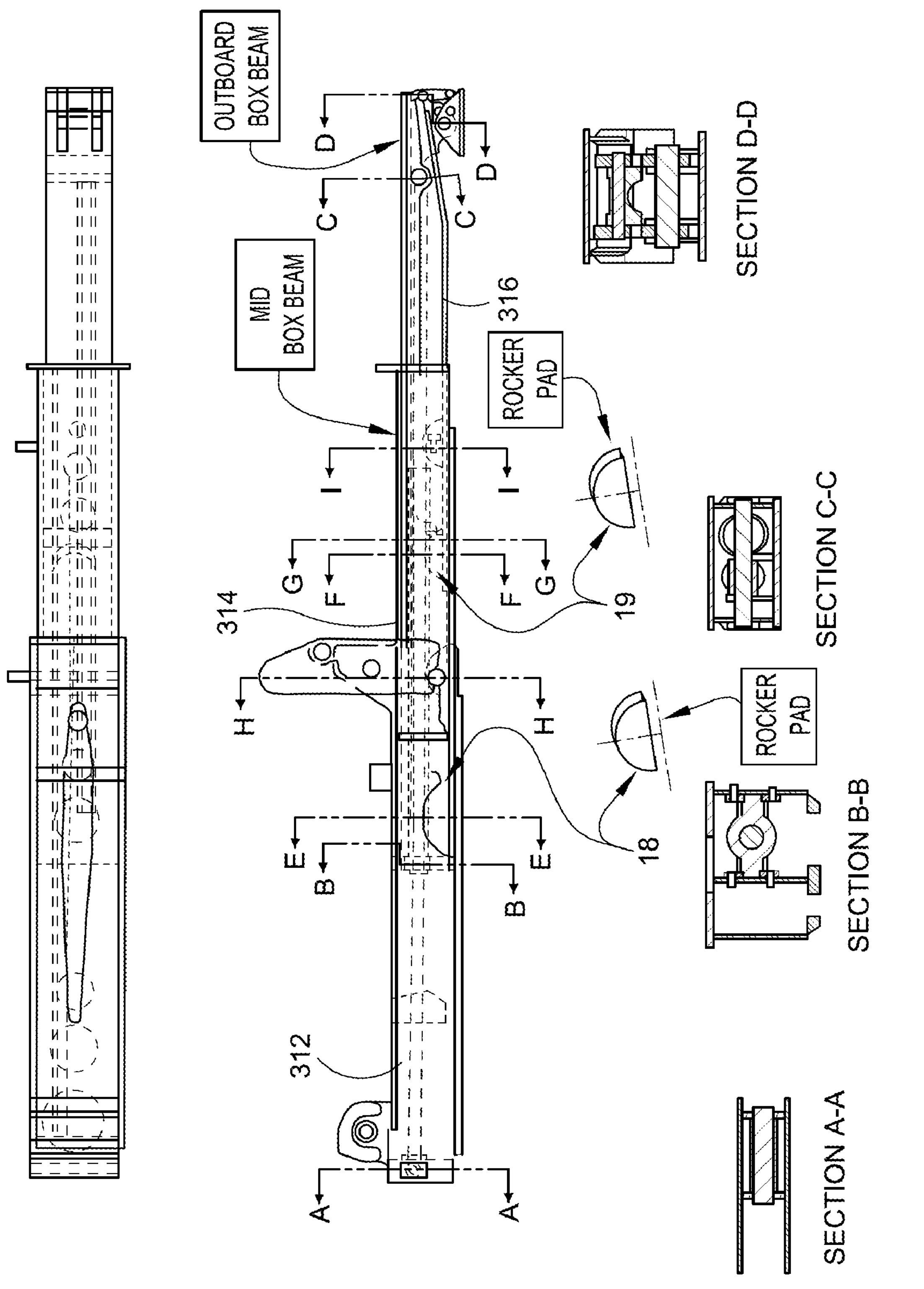
FIG. 8 is a detailed view of the front outrigger system shown in FIG. 6.
Figure 9:
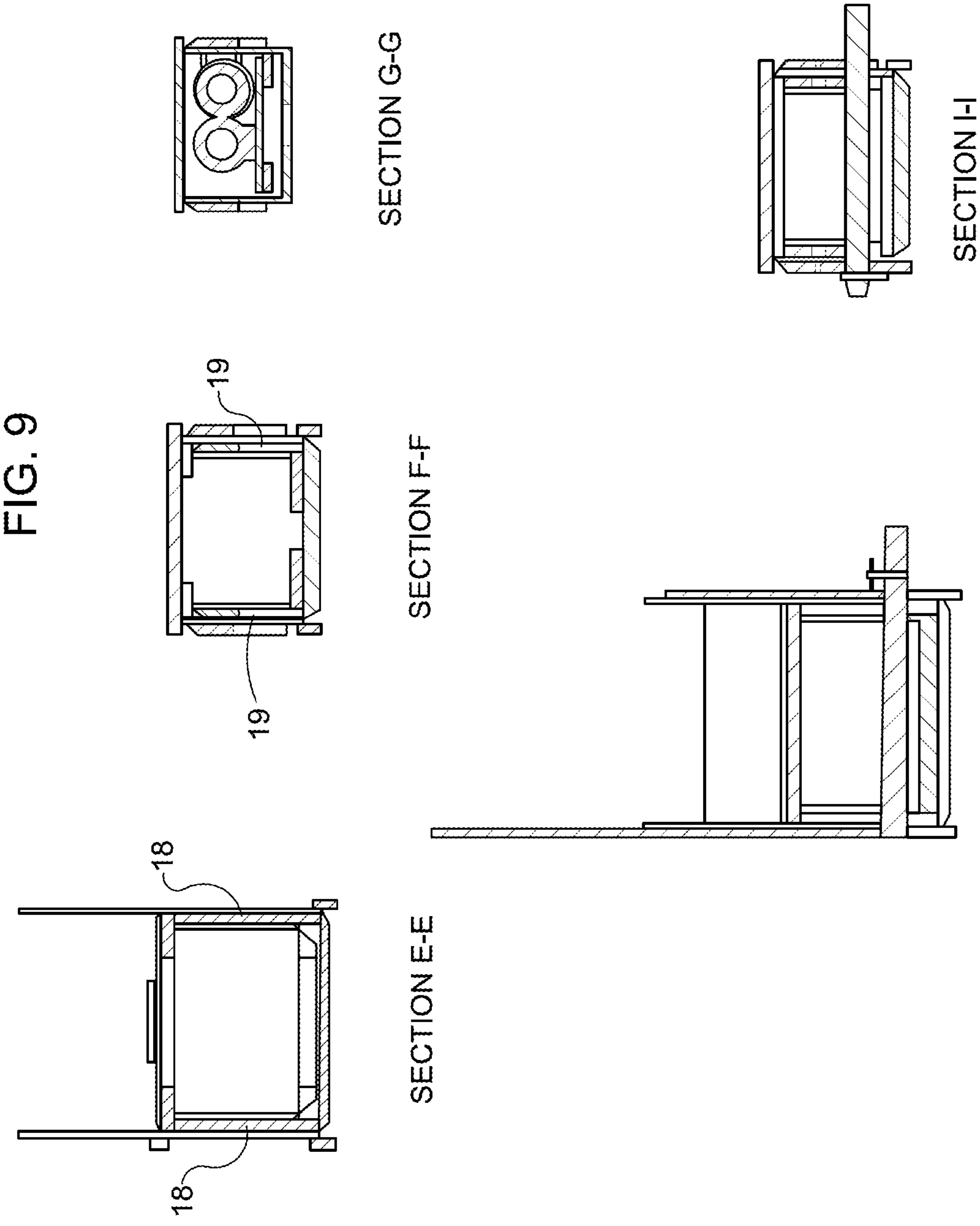
FIG. 9 is a cross-sectional view of the front outrigger system shown in FIG. 8.

Referring to FIGS. 8 and 9, the outrigger system 300 further includes a means for providing equal load distribution between the second end 328 of the base support member 312 and the first end of the extensible member 314 and between the second end 340 of the extensible member 314 and the first end of the extensible member 316. Referring particularly to FIG. 8, the outrigger system 300 is shown as including a first pair of rocker pads 18 and a second pair of rocker pads 19. The rocker pads 18 provide equal load distribution between the second end 328 of the base support member 312 and the first end of the extensible member 314, while the rocker pads 19 provide equal load distribution between the second end 340 of the extensible member 314 and the first end of the extensible member 316.

Referring to FIG. 9, the rocker pads 18 and 19 are shown as being positioned adjacent to an inner sidewall of the base support member 312 and the extensible member 314 respectively. The rocker pads 18 and 19 are configured to move in conjunction with the extensible member 314 and the extensible member 316. A plate provided within the extensible members 314 and 316 has a profile configured to receive a top profile of the rocker pads 18 and 19. According to an exemplary embodiment, the rocker pads 18 and 19 are semi-circular members having a flat surface configured to slidably engage the base support member 312 and the extensible member 314 respectively. The rocker pads 18 and 19 are maintained in a position adjacent to an inner side wall of the base support member 312 and the extensible member 314 respectively by retaining plates shown in FIG. 9.

As can be appreciated, as the extensible members 314 and 316 are extended, the clearance angles between the outrigger support members varies. The addition of the rocker pads 18 and 19 may assist in providing equal load distribution by compensating for these variations. The rocker pads 18 and 19 may also compensate for irregularities attributable to fabrication.

The wrecker 100 is further shown as including a rear outrigger system 400, which is commonly referred to by persons skilled in the art as the rear spades. The rear outrigger system 400 is supported at the second end 116 of the chassis 110 and is configured to extend outwardly from the second end 116 and engage a surface for providing additional support and stabilization of the wrecker 100 during operation of the boom assembly 114. Referring to FIGS. 1 and 2, the rear outrigger system 400 generally includes two outriggers (shown as a first outrigger 402 and a second outrigger 404) each comprising a base section 406 fixedly coupled to the sub-frame assembly 128, an extensible section 408 received within the base section 406, an actuator device (not shown) for moving the extensible section 408 telescopically within the base section 406 between a retracted stowed or transport position (shown in FIG. 1) and an extended use or stabilizing position (shown in FIG. 2), and a ground engaging foot 410 provided at a free end of the extensible section 408 and configured to engage a surface.

According to the embodiment illustrated, the base section 406 is mounted to the sub-frame 128 at an angle relative to the chassis 110 such that the extensible section 408 extends away from the second end 116 of the wrecker 100 when moving towards the stabilizing position. By extending away from the second end 116, as opposed to moving substantially perpendicular to the chassis 110, the rear outrigger system 400 achieves a wider base or stance for stabilizing the wrecker 100 during operation of the boom assembly 114.

Figure 10:
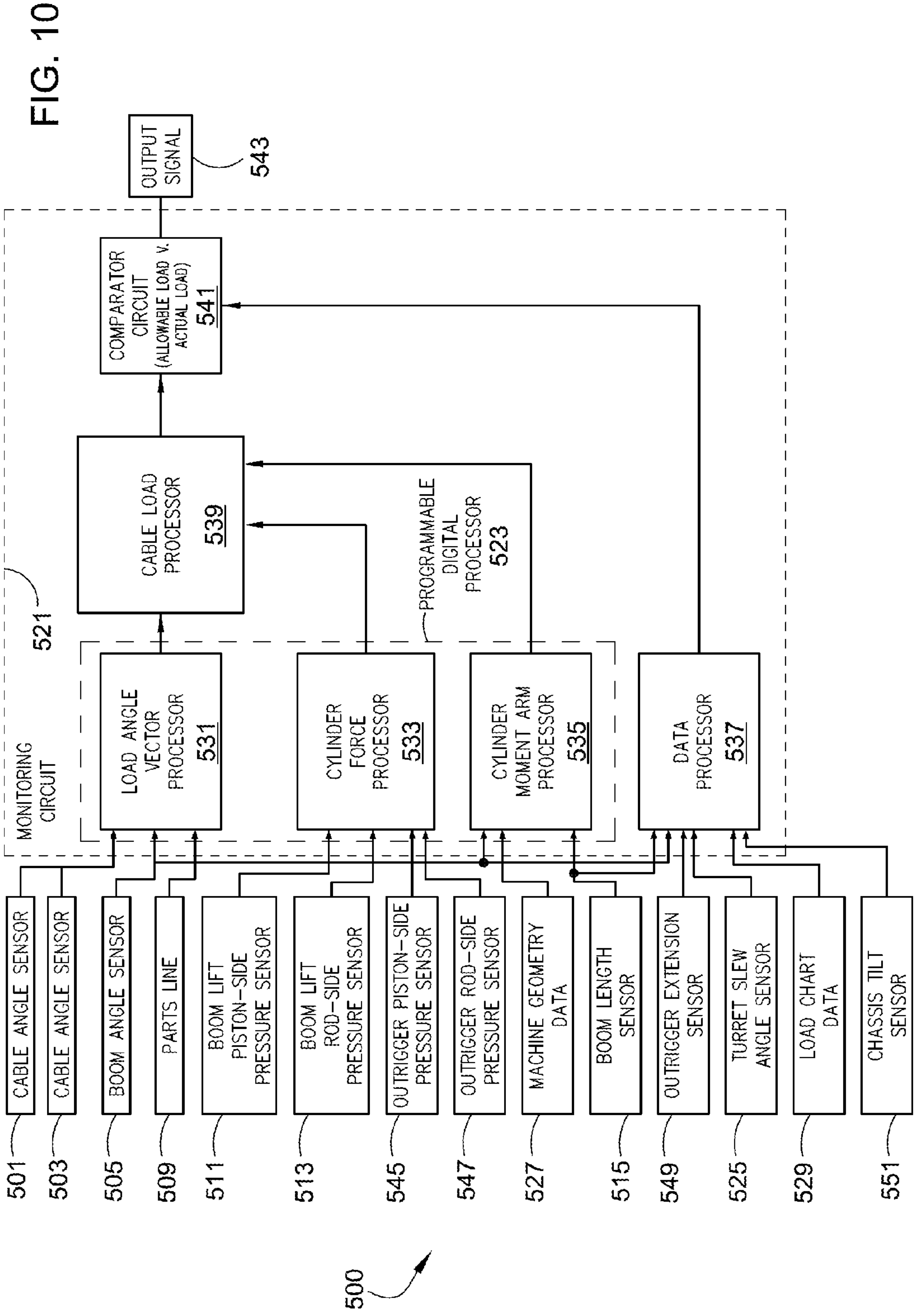
FIG. 10 is a block diagram of an embodiment of a monitoring system suitable for use with the mobile lift device shown in FIG. 1.

FIG. 10 is a block diagram of an embodiment of monitoring system 500 of wrecker 100. Monitoring system 500 comprises a plurality of sensors used to monitor the stability of wrecker 100 while manipulating a load. Monitoring system 500 further comprises a monitoring circuit 521, where monitoring circuit 521 further includes programmable digital processor 523. Programmable digital processor 523 monitors signals representative of the forces exerted on load bearing cable 168 and determines if the forces are sufficient to compromise the stability or structure of wrecker 100, based on the representative signals generated by the plurality of sensors. Programmable digital processor 523 comprises load angle vector processor 531, cylinder force processor 533, and cylinder moment arm processor 535.

Referring to FIG. 10, a first cable angle sensor 501 is shown that preferably generates a signal representative of the angle of load bearing cable 168, relative to the position of boom assembly 114 in a first axis. A second cable angle sensor 503 generates a signal representative of a second angle of load bearing cable 168 relative to boom assembly 114 in a second axis. The first and second cable angle sensors (501, 503) are preferably coupled to load angle vector processor 531, of programmable digital processor 523, for transmitting signals representative of the angle of load bearing cable 168. The first and second cable angle sensors (501, 503) preferably include potentiometers and/or encoders (not shown), which are configured to measure the angle of load bearing cable 168 relative to the longitudinal axis of boom assembly 114 and angle concentric to the longitudinal axis. An alternate embodiment of first and second cable angle sensors (501, 503) preferably includes low-g (i.e., gravitational force) accelerometers (not shown), which are further configured to measure the angle of load bearing cable 168. Although two cable angle sensors are shown in FIG. 10, according to another exemplary embodiment, more than two cable angle sensors may be used to measure the angle of load bearing cable 168, particularly in a third or fourth axis.

A first axis boom angle sensor 505 is coupled to load angle vector processor 531, of programmable digital processor 523, wherein first axis boom angle sensor 505 generates a signal representative of the first axis angle, which is the angle of boom assembly 114 relative to chassis 110, along the first axis (i.e., vertical axis). The axis angle signal generated by the first axis boom angle sensor 505 is transmitted to load angle vector processor 531, of programmable digital processor 523, in order to generate the force signal representative of the force exerted on load bearing cable 168 and boom assembly 114. The first axis boom angle sensor 505 may further include potentiometers and/or encoders (not shown), which are configured to measure the angle of boom assembly 114 relative to a horizontal plane.

Parts of line input 509 is shown coupled to load angle vector processor 531, of programmable digital processor 523. Parts of line input 509 is preferably used to determine the line pull and the tension on load bearing cable 168. Parts of line input 509, boom angle sensor 505, and cable angle sensors (501, 503) are coupled to monitoring circuit 521 by load angle vector processor 531 in programmable digital processor 523. Load angle vector processor 531 uses the signals coupled thereto to calculate the load angle vector on boom sheaves 166 and 167.

Boom-lift pressure sensors 511 and 513 are coupled to monitoring circuit 521 for measuring the pressure of actuator device 142. In one embodiment, a piston-side pressure sensor 511 and a rod-side pressure sensor 513 of actuator device 142, for adjusting base boom section 136 (i.e., pair of hydraulic boom lift cylinders), are coupled to cylinder force processor 533 of monitoring circuit 521. Pressure sensors 511 and 513 measure the pressure at the piston-side and rod-side of actuator device 142, respectively. Cylinder force of actuator device 142 may preferably be measured as a function of cylinder pressure and area. Cylinder force processor 533 uses signals from pressure sensors 511 and 513 to calculate the cylinder force on actuator device 142. In an exemplary embodiment, cylinder force is preferably calculated by determining the difference in force between the piston-side force and the rod-side force of actuator device 142.

Machine geometry data 527 and boom length sensor 515 are coupled to cylinder moment arm processor 535 of programmable digital processor 523. Machine geometry data 527 comprises the geometry of winches 171 and actuator device 142 relative to boom assembly 114. Boom length sensor 515 is configured to generate a signal representative of the extension of boom assembly 114. Further, a force signal may be calculated from the representative signals generated by length sensor 515 and first axis boom angle sensor 505. Cylinder moment arm processor 535 processes signals from machine geometry data 527 and boom length sensor 515 to calculate the lift cylinder moment arm, the horizontal weight of boom assembly 114, and the center of gravity proximate to a pivot pin of boom assembly 114.

Outrigger system 300 assists in stabilizing wrecker 100 as boom assembly 114 manipulates a load. Outrigger cylinder pressure sensors 545 and 547 are coupled to monitoring circuit 521 for measuring the pressure of actuator device 320 of outrigger system 300. In one embodiment, piston-side pressure sensor 545 and rod-side pressure sensor 547 of actuator device 320, for adjusting base support member 312 (i.e., pair of hydraulic outrigger support cylinders), are coupled to cylinder force processor 533 of monitoring circuit 521. Pressure sensors 545 and 547 measure the pressure at the piston-side and rod-side of actuator device 320, respectively. Cylinder force processor 533 uses signals from pressure sensors 545 and 547 to calculate the cylinder force on actuator device 320. In an exemplary embodiment, cylinder force can be calculated by determining the difference in force between the piston-side force and the rod-side force of actuator device 320.

Outrigger extension sensor 549 is also coupled to cylinder moment arm processor 535 of programmable digital processor 523. Outrigger extension sensor 549 is configured to generate a signal representative of the extension of outrigger base support member 312 and one or more extensible support members (shown as a first extension member 314 and a second extension member 316 in FIGS. 3 and 6). Outrigger extension sensor 549 preferably includes a cable reel with at least one potentiometer to measure the amount of extension of outrigger base support member 312 and extensible support members 314 and 316 from actuator device 320. Further, a force signal may be calculated from the representative signals generated by outrigger extension sensor 549 and the angular orientation of base support member 312. Cylinder moment arm processor 535 processes signals from machine geometry data 527 and outrigger extension sensor 549 to calculate the outrigger support cylinder moment arm proximate to a pivot shaft 338 of outrigger base support member 312.

Turret 134 (shown in FIG. 4) is configured to rotate a full 360 degrees about the vertical axis relative to the chassis 110. Turret slew angle sensor 525 generates a signal representative of the angle of rotation of turret 134 to data processor 537 of monitoring circuit 521. Load chart data 529 is also coupled to data processor 537. Load chart data 529 comprises a matrix of load data for determining compatible angles and lengths for boom assembly 114 for manipulating a given load. Data processor 537 uses the signals from turret slew angle sensor 525 and load chart data 529 to select the appropriate load chart and calculate the allowable load for wrecker 100. Chassis tilt sensor 551 is further coupled to data processor 537, such that chassis tilt sensor 551 provides an angular orientation of chassis 110 relative to the ground surface.

Programmable digital processor 523 performs various calculations to assist in determining the actual force exerted on load bearing cable 168. Cable load processor 539 is configured to receive the outputs of programmable digital processor 523. Cable load processor 539 is further configured to use the signals from programmable digital processor 523 to determine the actual load on load bearing cable 168 by totaling the moments about pivot pin of boom assembly 114. Cable load processor 539 and data processor 537 are preferably coupled to comparator circuit 541. Comparator circuit 541 is configured to compare the actual calculated load generated by cable load processor 539 to the allowable load generated by data processor 537. In one embodiment, comparator circuit 541 will provide notification to the operator, by way of output signal 543, when the actual load reaches or exceeds a predetermined threshold with reference to the allowable load value. In yet another embodiment, monitoring circuit 521 will provide a lockout feature, wherein monitoring circuit 521 preferably disables manipulation of boom assembly 114 when the actual load reaches or exceeds a predetermined threshold value. In such an embodiment, monitoring circuit 521 preferably disables certain substantial components of the wrecker 100 which may compromise the vehicle's stability, including, but not limited to, boom assembly 114 and winch 171. Upon reaching a predetermined threshold value, monitoring circuit 521 preferably disables the telescopic extension of boom assembly 114 or the elevation of boom assembly 114, which is controlled by a hydraulic fluid control of actuator device 142, in order to stabilize wrecker 100. Monitoring circuit 521 also preferably disables retraction of load bearing cable 168 by winch 171 upon reaching a predetermined threshold value with reference to the allowable load value of load bearing cable 168 and boom assembly 114.

It is important to note that the construction and arrangement of the mobile lift system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, elements shown as multiple parts may be integrally formed, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A mobile lift device, the device comprising:

a chassis for movement over a surface;

a rotator supported by the chassis;

a boom coupled to the rotator to permit the boom to pivot about at least two axes relative to the chassis;

a first hydraulic operator coupled to the boom to pivot the boom relative to the rotator;

a second hydraulic operator coupled to the rotator to rotate the rotator relative to the chassis;

a plurality of outriggers coupled to the chassis to provide stabilization of the chassis during load handling;

a sheave supported at a distal end of the boom, the sheave rotatably supported to rotate about at least two axes relative to the boom;

a first hoist supported at the rotator;

a cable supported by the first hoist and the sheave;

a first angle sensor configured to generate a first angle signal representative of a first angle of the cable relative to the boom;

a second angle sensor configured to generate a second angle signal representative of a second angle of the cable relative to the boom; and a monitoring circuit coupled to the first and second angle sensors to determine at least one force applied to the device based at least upon the angle signals and determining whether the force is sufficient to tip the mobile lift device.

2. The mobile lift device of claim 1, further comprising a tension signal generation device coupled to the monitoring circuit and configured to generate a tension signal representative of a tension of the cable, wherein the force is further determined based upon the tension signal.

3. The mobile lift device of claim 2, further comprising:

a hydraulic fluid control coupled to the first hydraulic operator and the monitoring circuit, wherein the hydraulic fluid control controls a flow of hydraulic fluid to the first hydraulic operator in accordance with a determination of the monitoring circuit.

4. The mobile lift device of claim 3, wherein the flow of hydraulic fluid is substantially terminated when the force is within a predetermined range below that sufficient to tip or overload the mobile lift device.

5. The mobile lift device of claim 4, wherein the boom includes a plurality of sections which are translatable relative to each other along a longitudinal axis to provide extension and retraction of the boom between a first length and a second length.

6. The mobile lift device of claim 4, further comprising a rotator angle sensor coupled to the rotator to generate a rotator angle signal representative of an orientation of the rotator relative to the mobile lift device, the monitoring circuit being coupled to the rotator angle sensor and configured to determine the force applied to the mobile lift device further based upon the rotator angle signal.

7. The mobile lift device of claim 4, wherein the force is a first force, and wherein the mobile lift device further comprises at least one outrigger coupled to the chassis to stabilize the chassis and an outrigger sensor coupled to the at least one outrigger to generate an outrigger signal representation of a second force between the at least one outrigger and the chassis, the monitoring circuit being coupled to the outrigger sensor and configured to determine the first force applied to the mobile lift device further based upon the outrigger signal.

8. A tow vehicle for handling loads, the vehicle comprising:

a chassis;

a rotator supported by the chassis;

an extendable boom coupled to the rotator to permit the boom to pivot about at least two axes relative to the chassis, wherein the boom is extendable between a first length and a second length;

a first hydraulic operator coupled to the boom to pivot the boom relative to the rotator;

a second hydraulic operator coupled to the rotator to rotate the rotator relative to the chassis;

a plurality of outriggers coupled to the chassis to provide stabilization of the chassis during load handling;

a first sheave supported at a distal end of the boom, the first sheave rotatably supported to rotate about at least two axes relative to the boom;

a second sheave supported at the distal end of the boom proximate the first sheave, the second sheave rotatably supported to rotate about at least two axes relative to the boom;

a first hoist supported at the rotator;

a second hoist supported at the rotator;

a first cable supported by the first hoist and the first sheave;

a second cable supported by the second hoist and the second sheave;

a first angle sensor configured to generate a first angle signal representative of a first angle of the first cable relative to the boom;

a second angle sensor configured to generate a second angle signal representative of a second angle of the second cable relative to the boom; and a monitoring circuit coupled to the first and second angle sensors to determine at least one force applied to the vehicle based at least upon the angle signals and determining whether the force is sufficient to tip or overload the tow vehicle.

9. The tow vehicle of claim 8, further comprising:

a hydraulic fluid control coupled to the first hydraulic operator and the monitoring circuit, wherein the hydraulic fluid control controls a flow of hydraulic fluid to the first hydraulic operator in accordance with a determination of the monitoring circuit.

10. The tow vehicle of claim 9, wherein the flow of hydraulic fluid is substantially terminated when the force is within a predetermined range below that sufficient to tip or overload the tow vehicle.

11. The tow vehicle of claim 9, further comprising:

a third angle sensor coupled to the monitoring circuit and configured to generate a third angle signal representative of a third angle of a third cable relative to the boom; and a fourth angle sensor coupled to the monitoring circuit and configured to generate a fourth angle signal representative of a fourth angle of a fourth cable relative to the boom; wherein the monitoring circuit determines the force applied to the tow vehicle based also on the third and fourth angle signals.

12. The tow vehicle of claim 11, further comprising a rotator angle sensor coupled to the rotator to generate a rotator angle signal representative of an orientation of the rotator relative to the vehicle, the monitoring circuit being coupled to the rotator angle sensor and configured to determine the force applied to the tow vehicle further based upon the rotator angle signal.

13. The tow vehicle of claim 11, wherein the force is a first force, and wherein the tow vehicle further comprises an outrigger sensor coupled to the outrigger to generate an outrigger signal representative of a second force between the outrigger and the tow vehicle, the monitoring circuit being coupled to the outrigger sensor and configured to determine the first force applied to the tow vehicle further based upon the outrigger signal.

14. The tow vehicle of claim 11, wherein the flow of hydraulic fluid is substantially terminated when the first force is within a predetermined range below that sufficient to tip or overload the tow vehicle.

15. A mobile lift device, the mobile lift device comprising:

a chassis configured to move over a surface;

a rotator configured to be supported by the chassis;

a boom coupled to the rotator, the rotator configured to permit the boom to pivot about at least two axes relative to the chassis;

a first hydraulic operator coupled to the boom, the first hydraulic operator configured to pivot the boom relative to the rotator;

a second hydraulic operator coupled to the rotator, the second hydraulic operator configured to rotate the rotator relative to the chassis;

a plurality of outriggers coupled to the chassis, the plurality of outriggers configured to provide stabilization of the chassis during load handling;

a sheave supported at a distal end of the boom, the sheave rotatably supported to rotate about at least two axes relative to the boom;

a hoist supported at the rotator;

a cable supported by the hoist and the sheave;

a first angle sensor configured to generate a first angle signal, the first angle signal being configured to represent a first angle of the cable relative to the boom;

a second angle sensor configured to generate a second angle signal, the second angle signal being configured to represent a second angle of the cable relative to the boom; and a monitoring circuit coupled to the first angle sensor and the second angle sensor, the monitoring circuit configured to determine at least one force applied to the mobile lift device based at least upon the first angle signal and the second angle signal and the monitoring circuit configured to determine whether the force exceeds a predetermined value, the predetermined value representing a force required to tip the mobile lift device.

16. The mobile lift device of claim 15, further comprising a tension signal generation device coupled to the monitoring circuit and configured to generate a tension signal representative of a tension of the cable, wherein the force is further determined based upon the tension signal.

17. The mobile lift device of claim 16, further comprising:

a hydraulic fluid control coupled to the first hydraulic operator and the monitoring circuit, wherein the hydraulic fluid control is configured to control a flow of hydraulic fluid to the first hydraulic operator based on a signal from the monitoring circuit.

18. The mobile lift device of claim 17, wherein the flow of hydraulic fluid is substantially terminated when the force is less than the predetermined value.

19. The mobile lift device of claim 18, wherein the boom includes a plurality of sections, the plurality of sections configured to be translatable relative to each other along a longitudinal axis to provide extension and retraction of the boom between a first length and a second length.

20. The mobile lift device of claim 18, further comprising a rotator angle sensor coupled to the rotator to generate a rotator angle signal representative of an orientation of the rotator relative to the mobile lift device, the monitoring circuit being coupled to the rotator angle sensor and configured to determine the force applied to the mobile lift device further based upon the rotator angle signal.

21. The mobile lift device of claim 18, wherein the force is a first force, and wherein the mobile lift device further comprises at least one outrigger coupled to the chassis to stabilize the chassis and an outrigger sensor coupled to the at least one outrigger to generate an outrigger signal representation of a second force between the at least one outrigger and the chassis, the monitoring circuit being coupled to the outrigger sensor and configured to determine the first force applied to the mobile lift device further based upon the outrigger signal.

22. A tow vehicle, the tow vehicle comprising:

a chassis;

a rotator configured to be supported by the chassis;

a boom coupled to the rotator, the rotator configured to permit the boom to pivot about at least two axes relative to the chassis, wherein the boom is extendable between a first length and a second length;

a first hydraulic operator coupled to the boom, the first hydraulic configured to pivot the boom relative to the rotator;

a second hydraulic operator coupled to the rotator, the second hydraulic configured to rotate the rotator relative to the chassis;

a plurality of outriggers coupled to the chassis, the plurality of outriggers configured to provide stabilization of the chassis during load handling;

a first sheave supported at a distal end of the boom, the first sheave rotatably supported to rotate about at least two axes relative to the boom;

a second sheave supported at the distal end of the boom proximate the first sheave, the second sheave rotatably supported to rotate about at least two axes relative to the boom;

a first hoist configured to be supported at the rotator;

a second hoist configured to be supported at the rotator;

a first cable configured to be supported by the first hoist and the first sheave;

a second cable configured to be supported by the second hoist and the second sheave;

a first angle sensor configured to generate a first angle signal, the first angle signal being configured to represent a first angle of the first cable relative to the boom;

a second angle sensor configured to generate a second angle signal, the second angle signal being configured to represent a second angle of the second cable relative to the boom; and a monitoring circuit coupled to the first and second angle sensors, the monitoring circuit configured to determine at least one force applied to the tow vehicle based at least upon the first angle signal and the second angle and configured to determine whether the force exceeds a predetermined value, the predetermined value representing a force required to tip or overload the tow vehicle.

23. The tow vehicle of claim 22, further comprising:

a hydraulic fluid control coupled to the first hydraulic operator and the monitoring circuit, wherein the hydraulic fluid control is configured to control a flow of hydraulic fluid to the first hydraulic operator based on a signal from the monitoring circuit.

24. The tow vehicle of claim 23, wherein the flow of hydraulic fluid is substantially terminated when the force is less than the predetermined value.

25. The tow vehicle of claim 23, further comprising:

a third angle sensor coupled to the monitoring circuit and configured to generate a third angle signal representative of a third angle of a third cable relative to the boom; and a fourth angle sensor coupled to the monitoring circuit and configured to generate a fourth angle signal representative of a fourth angle of a fourth cable relative to the boom; wherein the monitoring circuit is configured to determine the force applied to the tow vehicle based also on the third angle signal and the fourth angle.

26. The tow vehicle of claim 25, further comprising a rotator angle sensor coupled to the rotator to generate a rotator angle signal representative of an orientation of the rotator relative to the vehicle, the monitoring circuit being coupled to the rotator angle sensor and configured to determine the force applied to the tow vehicle further based upon the rotator angle signal.

27. The tow vehicle of claim 25, wherein the force is a first force, and wherein the tow vehicle further comprises an outrigger sensor coupled to the outrigger to generate an outrigger signal representative of a second force between the outrigger and the tow vehicle, the monitoring circuit being coupled to the outrigger sensor and configured to determine the first force applied to the tow vehicle further based upon the outrigger signal.

28. The tow vehicle of claim 25, wherein the flow of hydraulic fluid is substantially terminated when the first force is within a predetermined range below that sufficient to tip or overload the tow vehicle.

* * * * *